May 8, 1923.                                                              1,454,693

F. F. SCHLATTAU

MEASURING INSTRUMENT

Filed Aug. 27, 1921

Inventor

F. F. Schlattau.

By Geo. F. Kimmel

Attorney

Patented May 8, 1923.

1,454,693

UNITED STATES PATENT OFFICE.

FRANK F. SCHLATTAU, OF LOS ANGELES, CALIFORNIA.

MEASURING INSTRUMENT.

Application filed August 27, 1921. Serial No. 496,084.

*To all whom it may concern:*

Be it known that I, FRANK F. SCHLATTAU, a citizen of the United States, residing at Los Angeles, in the county of Los Angeles and State of California, have invented certain new and useful Improvements in Measuring Instruments, of which the following is a specification.

The invention relates to improvements in measuring instruments, and more particularly to a compound form of the same adapted for general use by mechanics and especially for civil engineers or surveyors.

The principal object of the invention is to provide for an instrument of the type specified, and one of any extremely simplified construction and arrangement of parts, and which is of a maximum efficiency and accuracy in the measuring of angles, inclinations, and the like.

Another object of the invention is to provide for an instrument of the class mentioned, and one embodying in its preferred construction and arrangement, a rule, a square, a compass, vertical and horizontal levels, and a scaled bar for the measuring or determining of degrees of grade or inclination.

With the foregoing and other objects in view, the invention resides in the certain novel and useful construction and arrangement of parts as will be hereinafter more full described, set forth in the appended claims, and illustrated in the accompanying drawings, in which:—

Figure 1:
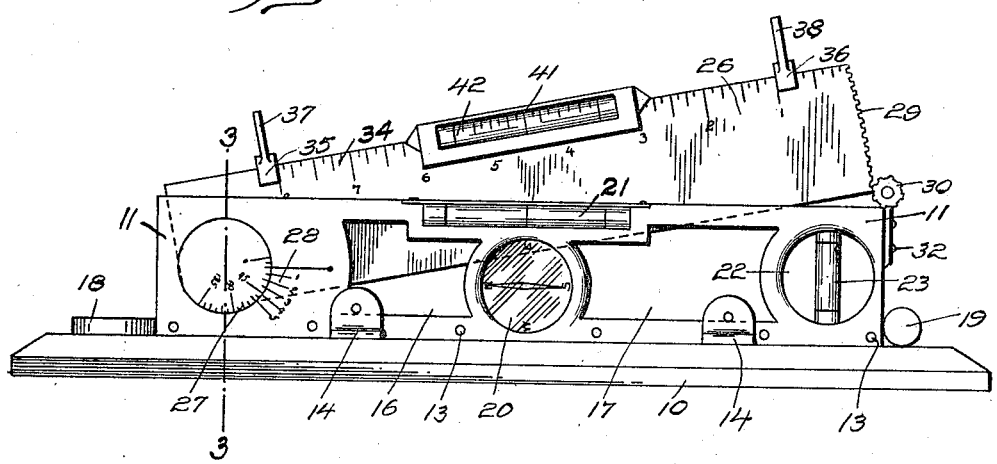
Figure 2:
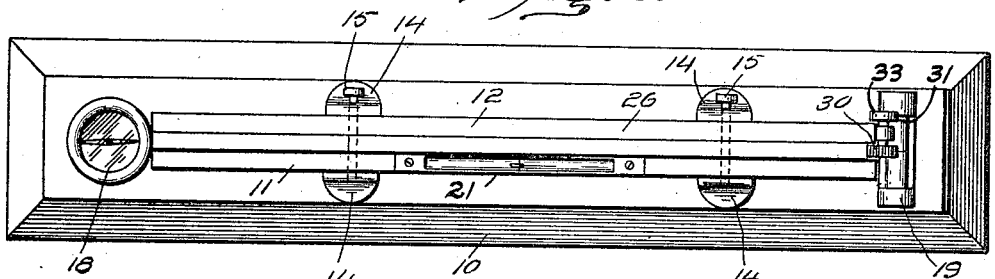
Figure 3:
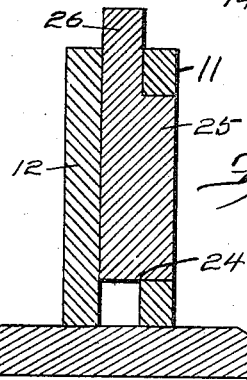
Figure 4:
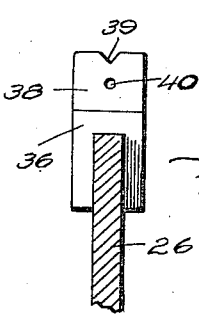

Figure 1 is a front side elevation of the device or instrument in its preferred embodiment, Fig. 2 is a top plan view thereof, Fig. 3 is a vertical transverse section taken on the line 3—3 of Fig. 1, and, Fig. 4 is a fragmentary sectional detail of the pivoted scale bar or rule blade showing one of the adjustable sights thereon in side elevation.

Referring to the drawing, wherein similar characters of reference designate corresponding parts in the several views thereof, the preferred embodiment of the device or instrument comprises an elongated rectangular base 10 having a pair of frame members or plates 11 and 12 spaced apart one from the other, and secured in such relation by means of suitable fastening elements or screws 13, preferably along the lower edge portion only thereof, and this frame is adapted to be removably clamped in position on the longitudinal center of the base between pairs of spaced ears or lugs 14, which are secured on the upper face of the base, suitable screw devices 15 being engaged in the ears or lugs 14 and passing through open portions 16 and 17 of the frame members or plates 11 for the purpose. The opposite ends of the frame members or plates 11 and 12, when the same are secured in position on the base 10, are spaced inwardly of the opposite ends of the latter and between a compass 18 secured in position on one end of the base 10 and a transversely extending spirit level device 19, which is secured in position on the opposite end thereof. Formed medially of the opposite end of the front frame member or plate 11, and between openings 16 and 17 therein, is a circular opening in which is mounted a compass 20, and immediately above this opening and the compass 20 therein, the top edge of the frame member or plate 11 is formed to provide an elongated recess adapted to snugly receive a spirit level device 21, the upper face of the latter being disposed flush in the plane of the top edge thereof. Formed inwardly of one end of the front frame member or plate 11 is a second circular opening 22, in which, on the vertical diameter thereof, is mounted a spirit level device 23, and this device may be viewed from the rear side of the instrument or device through an alining circular opening formed in the rear frame member or plate 12.

Formed at the opposite end of the front frame member or plate 11, slightly inwardly thereof, is a circular opening 24 in which is engaged a circular hub or thickened portion 25 of a scale bar or rule blade 26, whereby the latter is to be mounted for pivotal movement between the front and rear frame members or plates 11 and 12. The outer face of the hub portion 25 is disposed flush in the plane of the outer face of the front frame member or plate 11, and is ruled with a number of radially extending degree lines 27 whereby to provide a scale of protractor form, preferably ten of such lines being used and the major ones thereof being arranged to indicate zero, 45, 90 and 135 degrees, respectively, and this protractor scale is cooperative with a vernier scale 28 formed of a series of radially extending lines marked on the surrounding outer face of the frame member or plate 11, the major of which lines are numbered 1 to 5, inclusive, the hub portion 25 is formed at one side of the rule bar or blade 26, immediately at one end thereof, so that the latter is pivoted for vertical movement between the frame members or plates 11 and 12, and extends forwardly from its pivotal point and has its opposite end terminating slightly inward of the complemental ends of the members or plates 11 and 12, the free end edge of the bar or plate 26 being toothed, as at 29, for engagement with a toothed cog wheel or pinion 30, which is keyed on a spindle 31 journaled in a bracket 32 secured in proper position on the adjacent end of the frame members or plates 11 and 12. The spindle 31 has one end projecting outwardly of the bracket 32 and secured on this end portion is a knurled finger piece or clutch 33, whereby upon the manipulation of the latter, the spindle 31, and the cog or pinions 30 carried thereby, is rotated for effecting a raising and lowering movement of the rule bar or blade 26.

The outer front face of the rule bar or member 26 is provided with a scale of graduations 34 in inches thereon, and the length of this scale may be varied accordingly with the length of the rule bar or blade used. Removably mounted on the upper edge of the rule bar or blade 26, and slidably adjustable thereon, is a pair of sighting attachments 35 and 36, and each of these attachments is formed to provide blade portions 37 and 38, respectively, which are provided in their top edges with substantially V-shaped sighting apertures 39 and at a central point immediately below the sighting apertures 39, with circular sighting openings 40, as shown in Fig. 4. Adapted to be detachably mounted on the upper edge of the rule bar or blade 26 is a spirit level 41, which is provided with a scale of indications 42, formed on the same and reading in degrees of inclination or altitude, when the bar or blade 26 is raised to a desired or necessary position.

In the use of the device or instrument thus provided, the same may be used after the manner of a surveyor transit, or the like for the measuring of angles of inclination, altitude or grade, when the frame formed by the members or plates 11 and 12, is positioned on the base 10, and the latter suitably supported in proper position for the purpose, as by being mounted on a tripod (not shown), when, upon the vertical angular adjustment of the rule bar or blade 26 to a desired or necessary inclination, the angle of such inclination will be read directly in degrees from the protractor scale 27 associated with the vernier scales 28, while the degree of altitude will be read directly in degrees from the scale 42 of the spirit level device 41, which, as before stated, is to be carried on the upper edge of the rule blade 26 for the purpose, the sighting of the device or instrument being accomplished by the use of the sight devices 35 and 36, also carried on the upper edge of the bar or blade 26. Correspondingly, the three spirit levels 19, 21 and 23, are to be used as "trying" levels or perpendiculars, after the well known manner of such devices.

When it is desired to make use of the device as an angle or square, the frame is removed from the base 10, by the withdrawing of the fastenings or screws 15 from the ears or supports 14, and lifting the same from between the latter, or by a sliding movement outwardly thereof upon the removal of the compass 18 from its position on one end of the base 10, as may be desired or necessary, when the blade 26 may have its toothed end swung clear of the teeth of the cog or pinions 30, and be moved to a position of 45 degrees in angular relation with respect to the frame, for use as a 45 degree angle, such position being accurately determined by reference to the protractor scale 27, and its associated vernier scale 28, or to a position of 90 degrees with respect to the frame, for use as a square. It is to be noted, however, that the blade may be moved to any other desired angular relation with respect to the frame, whereby to form any desired angle within the range of the protractor scale which, as hereinbefore stated, is preferably designed to read up to and including 135 degrees. It is also to be here noted that the arrangement of the compass 18 at one end of the base 10, and the spirit level 19 at the opposite end thereof, the frame, formed by the members or plates 11 and 12, is held between these devices in a manner to prevent longitudinal displacement of the same in either direction.

From the foregoing, it will be readily apparent that the invention provides for an instrument capable of being used, as a whole, by civil engineers, surveyors, and other persons, in a manner similar to an engineer's transit, level or sextant, for the determining of angle or degrees of inclination or grade; the frame portion of the same as an ordinary mechanic's level, when the same is removed from the base; and as an angle or square, when the frame is removed from the base, and the blade moved into 45 or 90 degree angular relation with respect to the frame.

It is well understood that, while the instrument or device has been described and illustrated in specific terms and detail, various changes in and modifications of the same may be resorted to, without departing from the spirit of the invention, or the scope of the claims appended hereto.

Having shown and described my invention, what I now claim as new and desire to secure by Letters Patent of the U. S. is:—

1. In a device for the purpose set forth a base, a frame disposed lengthwise thereof, a rule blade within and pivoted to the frame for swinging movement in a vertical plane, spirit levels extending lengthwise of the frame and blade, a vertical spirit level mounted in the frame, a spirit level disposed transversely of the base, and a sighting device on said blade.

2. In a device for the purpose set forth an elongated base, a frame supported thereby and disposed lengthwise thereof, a rule blade within and pivoted to the frame for swinging movement in a vertical plane, a plurality of spirit levels carried by the frame, a spirit level secured to the base and blade, and a sighting device on the blade.

3. In a device for the purpose set forth, an elongated base, a frame removably connected to and disposed lengthwise of the base, spirit level devices carried by the frame, a spirit level device secured to the base, a rule blade pivoted in said frame for swinging movement in a vertical plane, and means at one end of the frame and engaging one end of the blade for varying the angular inclination of the blade with respect to the base and frame.

4. In a device for the purpose set forth an elongated base, a frame removably supported lengthwise thereof, spirit level devices carried by the base and frame, a rule blade pivoted to and disposed lengthwise of the frame for swinging movement in a vertical plane, and means at one end of the frame and engaging with the blade for varying the angular inclination of the blade with respect to the base and frame.

5. In a device for the purpose set forth a base, spirit levels carried by and disposed vertically and transversely of the base, a rule blade extending lengthwise of the base and pivotally mounted at one end for swinging movement in a vertical plane and having a protractor scale movable with the pivot thereof, a vernier scale supported from the base adjacent to and co-operative with said protractor scale, said blade having its free end toothed, and means engaging with the teeth of the blade for varying the angular inclination of said blade with respect to said base.

6. In a device for the purpose set forth an elongated base, an elongated frame, means for detachably securing the frame lengthwise of the base, a rule blade mounted in the frame for swinging movement in a vertical plane, a pivot hub formed with the blade and engaging in said frame at one end thereof, a protractor scale formed on the end face of said hub, a vernier scale on said frame and co-operative with said protractor scale, said blade having its free end toothed, means engaging the toothed end of the blade for varying the angular inclination of the rule blade with respect to the base and frame, a spirit level device disposed lengthwise of the blade and frame, and spirit level devices disposed transversely and vertically with respect to the base.

7. In a device of the class described, an elongated base, a frame extending lengthwise thereof, a rule blade pivoted at one end in said frame for swinging movement in a vertical plane, sighting devices carried on the upper edge of said blade and means for varying the angular inclination of said rule blade with respect to said base and said frame.

8. In a device of the class described, an elongated base, a frame extending lengthwise thereof, a rule blade pivoted in said frame at one end for swinging movement in a vertical plane, sighting devices removably mounted on the top edge of said rule blade, a spirit level device removably mounted on said rule blade in parallel relation with respect to the top edge thereof, and having a scale thereon graduated in degree indications, horizontal and perpendicular spirit level devices carried on said base and said frame, and means for varying the angular inclination of said rule blade with respect to said base and said frame.

In testimony whereof, I affix my signature hereto.

FRANK F. SCHLATTAU.